(12) United States Patent
Oda

(10) Patent No.: US 11,575,570 B2
(45) Date of Patent: Feb. 7, 2023

(54) COMMUNICATION APPARATUS, REDUNDANT COMMUNICATION SYSTEM, AND COMMUNICATION CONTROL METHOD

(71) Applicant: NEC Corporation, Tokyo (JP)

(72) Inventor: Kazuma Oda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/368,675

(22) Filed: Jul. 6, 2021

(65) Prior Publication Data

US 2022/0014430 A1    Jan. 13, 2022

(30) Foreign Application Priority Data

Jul. 9, 2020   (JP) .............................. JP2020-118176

(51) Int. Cl.
*H04L 12/24*       (2006.01)
*H04L 41/0813*   (2022.01)
*H04L 41/0853*   (2022.01)

(52) U.S. Cl.
CPC ...... *H04L 41/0813* (2013.01); *H04L 41/0853* (2013.01)

(58) Field of Classification Search
CPC ................... H04L 41/0813; H04L 41/0853
See application file for complete search history.

(56) References Cited

U.S. PATENT DOCUMENTS

2004/0133690 A1*   7/2004   Chauffour ........... H04L 67/1031
                                                                    709/225
2005/0055575 A1*   3/2005   Evans ................. H04L 41/0809
                                                                    726/4

FOREIGN PATENT DOCUMENTS

JP    2007-142976 A    6/2007
JP    2015-002436 A    1/2015
WO   WO-2011035598 A1 *  3/2011  ....... H04L 29/12273

* cited by examiner

*Primary Examiner* — Melvin C Marcelo
*Assistant Examiner* — Natali Pascual Peguero

(57) ABSTRACT

A communication apparatus is provided in a redundant communication system including a plurality of communication apparatuses having mutually-redundant configurations, and is configured so that its operating mode can be switched between a plurality of modes including an active mode and a standby mode. The communication apparatus includes a synchronization control unit configured to share client identification information with another communication apparatus included in the redundant communication system, and an address acquisition unit configured to acquire, in response to switching of the operating mode to the active mode, an IP address from a DHCP server by using the client identification information.

8 Claims, 9 Drawing Sheets

| APPARATUS TO BE MONITORED | IP ADDRESS |
|---|---|
| REDUNDANT COMMUNICATION APPARATUS 2 | 192.168.0.100 |
| ... | ... |

Fig. 4

|   | CLIENT ID |
|---|---|
| 1 | 1:XX:XX:XX:XX:XX:XX |

DEVICE_DB

```
lease{
fixed-address 192.168.0.100;
option dhcp-server-identifier 192.168.0.10;
renew 2019/09/05 17:51:09;
rebind 2019/09/05 17:55:30;
expire 2019/09/05 17:56:45;
}
```

Fig. 8

COMMUNICATION APPARATUS, REDUNDANT COMMUNICATION SYSTEM, AND COMMUNICATION CONTROL METHOD

INCORPORATION BY REFERENCE

This application is based upon and claims the benefit of priority from Japanese patent application No. 2020-118176, filed on Jul. 9, 2020, the disclosure of which is incorporated herein in its entirety by reference.

TECHNICAL FIELD

The present disclosure relates to a communication apparatus, a redundant communication system, and a communication control method.

BACKGROUND ART

It has been known that when a communication apparatus sets an IP (Internet Protocol) address by using a DHCP (Dynamic Host Configuration Protocol), the communication apparatus requests an IP address from a DHCP server. For example, Japanese Unexamined Patent Application Publication No. 2015-002436 discloses an information processing apparatus that requests an IP address from a DHCP server and sets the IP address provided by the DHCP server as an IP address of a default gateway.

Further, in a redundant communication system having a system redundancy, a method for performing system switching between an active system and a standby system without stopping services has been proposed. Japanese Unexamined Patent Application Publication No. 2007-142976 discloses an SIP (Session Initiation Protocol) server system in which the same service IP address is registered in each of multiplexed SIP servers, and the service IP address is enabled or disabled for each of the SIP servers according to the system switching between the active system and the standby system.

However, in the method disclosed in Japanese Unexamined Patent Application Publication No. 2015-002436, in the redundant communication system formed by a plurality of hardware apparatus to which different MAC (Media Access Control) addresses are assigned, the DHCP server manages an IP address while regarding the plurality of apparatuses as different systems. Therefore, when system switching between the active system and the standby system occurs, the DHCP server distributes an IP address different from the one used before the switching, therefore causing a problem that the IP addresses of the active apparatuses are changed before and after the switching. As a result, the consistency of the IP addresses in the redundant communication system is lost, and this inconsistency hinders the operation of the system such as an NMS (Network Management System) in which the active apparatuses is identified by the IP address.

Further, in the above-described method disclosed in Japanese Unexamined Patent Application Publication No. 2007-142976, in the case in which IP addresses are dynamically assigned by the DHCP server, a problem similar to the above-described problem occurs when, for example, a server that has newly become the active server re-acquires the service IP address.

SUMMARY

In view of the above-described problems, an example object of the present disclosure is to provide a communication apparatus, a redundant communication system, and a communication control method in which when system switching between an active system and a standby system occurs, an IP address of the active apparatus before the switching can be continuously used after the switching.

In a first example aspect, a communication apparatus includes at least one memory configured to store instructions, and at least one processor configured to execute the instructions. The at least one processor is configured to share client identification information with another communication apparatus in a redundant communication system including a plurality of communication apparatuses having mutually-redundant configurations, switch an operating mode between a plurality of modes including an active mode and a standby mode, and acquire, in response to switching of the operating mode to the active mode, an IP (Internet Protocol) address from a DHCP (Dynamic Host Configuration Protocol) server by using the client identification information.

In another example aspect, a redundant communication system includes a first communication apparatus and a second communication apparatus having mutually-redundant configurations. The first communication apparatus includes at least one first memory configured to store first instructions, and at least one first processor configured to execute the first instructions. The at least one first processor is configured to share client identification information with the second communication apparatus, switch an operating mode of the first communication apparatus between a plurality of modes including an active mode and a standby mode, and acquire, in response to switching of the operating mode of the first communication apparatus to the active mode, an IP address from a DHCP server by using the client identification information.

In another example aspect, a communication control method includes: sharing client identification information with another communication apparatus in a redundant communication system including a plurality of communication apparatuses having mutually-redundant configurations; switching an operating mode between a plurality of modes including an active mode and a standby mode; and acquiring, in response to switching of the operating mode to the active mode, an IP address from a DHCP server by using the client identification information.

BRIEF DESCRIPTION OF DRAWINGS

The above and other aspects, features and advantages of the present disclosure will become more apparent from the following description of certain example embodiments when taken in conjunction with the accompanying drawings, in which:

FIG. 4 shows an example of a data structure of a list of apparatuses to be monitored in an NMS according to the second example embodiment;

FIG. 8 shows an example of a data structure in a database of distributed IP addresses of the communication apparatus according to the second example embodiment;

EMBODIMENTS

Figure 1:
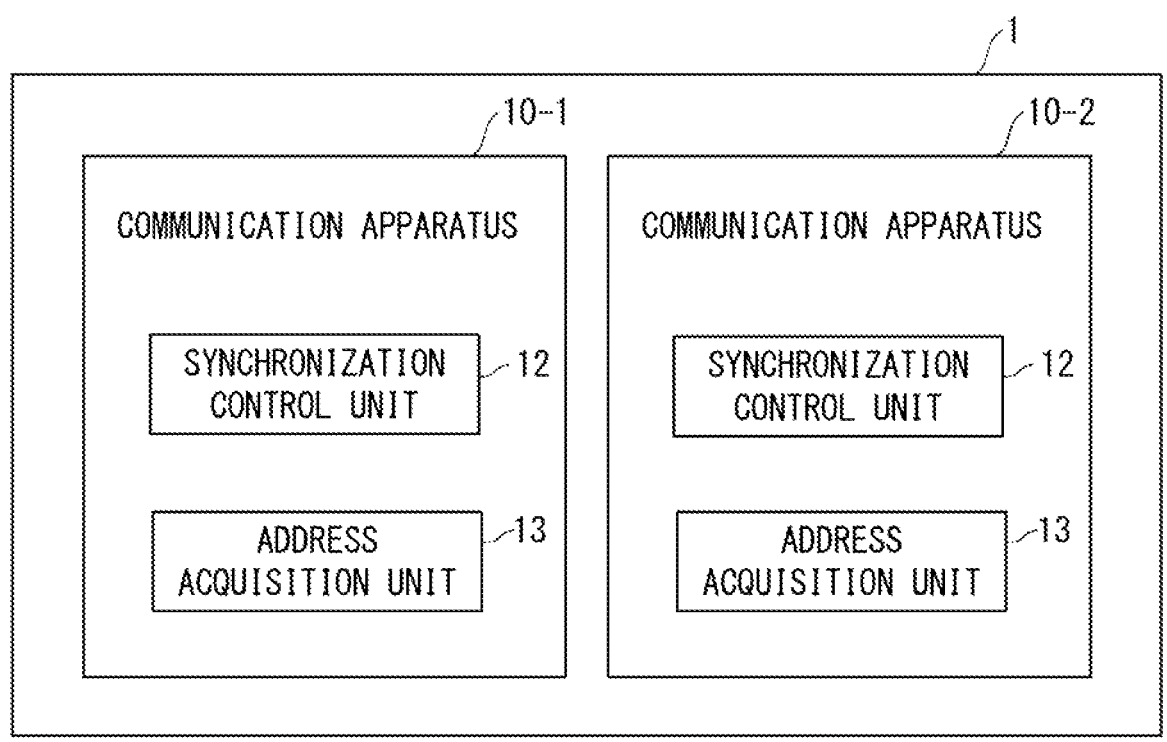
FIG. 1 is a block diagram showing a configuration of a redundant communication system according to a first example embodiment.

The present disclosure will be explained hereinafter through example embodiments. However, the invention according to the claims is not limited to the below-shown example embodiments. Further, all the components/structures described in the example embodiments are not necessarily indispensable as means for solving the problem. The same reference numerals (or symbols) are assigned to the same elements throughout the drawings and redundant explanations thereof are omitted as appropriate.

First Example Embodiment

Firstly, a first example embodiment according to the present disclosure will be described with reference to FIGS. 1 and 2. FIG. 1 is a block diagram showing a configuration of a redundant communication system 1 according to the first example embodiment. The redundant communication system 1 is a computer system including a plurality of communication apparatuses 10-1 and 10-2 having mutually-redundant configurations. In the following description, when the communication apparatuses 10-1 and 10-2 are not distinguished from one another, the communication apparatuses 10-1 and 10-2 may be simply referred to as the communication apparatus(es) 10. Note that although the number of communication apparatuses 10 included in the redundant communication system 1 is two in the below-shown example for simplifying the explanation, the number of communication apparatuses 10 may be three or more.

The communication apparatus 10 is configured so that its operating mode can be switched between a plurality of modes. The plurality of modes include an active mode and a standby mode. The communication apparatus 10 includes a synchronization control unit 12 and an address acquisition unit 13.

The synchronization control unit 12 shares a client identification information (ID) with the other communication apparatus(es) 10 included in the redundant communication system 1. That is, the communication apparatuses 10-1 and 10-2 share client IDs with each other. The address acquisition unit 13 acquires, in response to switching of the operating mode to the active mode, an IP address from a DHCP server by using the client ID.

Figure 2:
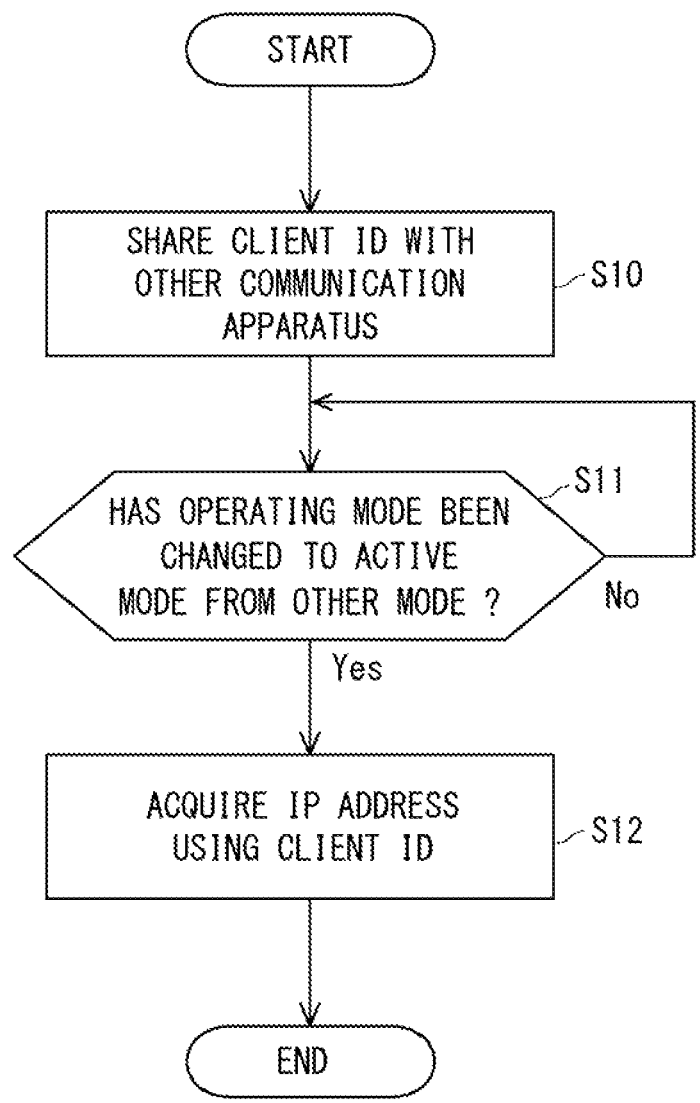
FIG. 2 is a flowchart showing processes performed by a communication apparatus according to the first example embodiment.

FIG. 2 is a flowchart showing processes performed by the communication apparatus 10 according to the first example embodiment. Although processes performed by the communication apparatus 10-1 will be described hereinafter as an example, the same applies to the communication apparatus 10-2. Firstly, the synchronization control unit 12 of the communication apparatus 10-1 shares a client ID with the other communication apparatus 10-2 included in the redundant communication system 1 (Step S10; Synchronization Control Step). Next, the communication apparatus 10-1 determines whether or not its own operating mode has been switched to the active mode from any of the other modes (Step S11). The address acquisition unit 13 of the communication apparatus 10-1 acquires, in response to switching of its own operating mode to the active mode (Yes in step S11), an IP address from the DHCP server by using the client ID (Step S12; Address Acquisition Step).

As described above, according to the first example embodiment, in the redundant communication system 1, when system switching occurs, the new active apparatus can continue to use the IP address of the active apparatus that had been used before the switching. In this way, in a system such as a network management system (NMS) in which the active apparatus is identified by its IP address, there is no need to register the IP address of the apparatus to be monitored or the like again when system switching is performed.

Second Example Embodiment

Figure 3:
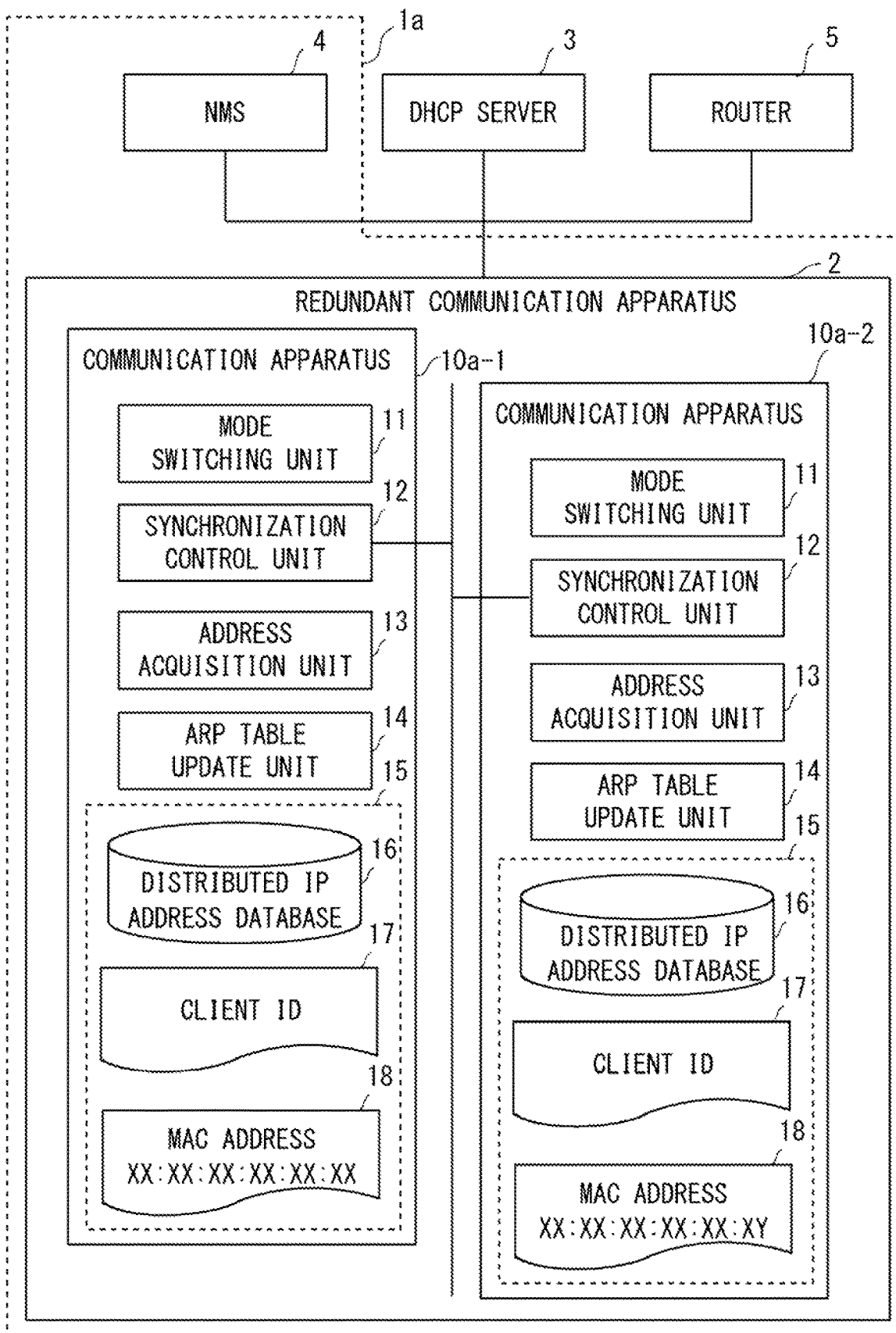
FIG. 3 shows an example of a configuration of a redundant communication system according to a second example embodiment together with a DHCP server and a router.

Next, a second example embodiment according to the present disclosure will be described with reference to FIGS. 3 to 10. FIG. 3 shows an example of a configuration of a redundant communication system 1*a* according to the second example embodiment together with a DHCP server 3 and a router 5.

(Redundant Communication System 1*a*)

The redundant communication system 1*a* is a computer system that operates and manages a plurality of communication apparatuses having mutually-redundant configurations. The redundant communication system 1*a* includes a redundant communication apparatus 2 and an NMS (Network Management System) 4.

The redundant communication apparatus 2 is a computer including a plurality of systems each of which is operated by independent hardware and an independent operating system, and these systems constitute a redundant system. In the drawing, an apparatus that functions as a first system is referred to as a communication apparatus 10*a*-1, and an apparatus that functions as a second system is referred to as a communication apparatus 10*a*-2. The redundant communication apparatus 2 operates and manages one of the plurality of communication apparatuses 10*a* as an active apparatus, and operates and manages the other communication apparatus(es) 10*a* as a standby apparatus(es).

The plurality of communication apparatuses 10*a* are connected to each other through an internal bus and exchange data with each other by using preset local IP addresses. For example, the communication apparatus 10*a* transfers data such as a configuration file to the other communication apparatus 10*a* by a remote file transfer protocol such as RCP (Remote Copy) or SCP (Secure Copy).

Further, the communication apparatus 10*a* functioning as an active system of the redundant communication apparatus 2 (hereinafter also referred to as the "active communication apparatus 10*a*") communicates with other apparatus on the network by using an IP address distributed from the DHCP server 3 (which will be described later).

The NMS 4 is a computer that monitors the communication apparatuses 10*a* by using IP addresses. The NMS 4 is connected to the active communication apparatus 10*a* of the redundant communication apparatus 2 so as to be able to communicate with the communication apparatus 10*a*, and uniquely identifies the active communication apparatus 10*a* to be monitored by the IP address by using a list of apparatuses to be monitored (hereinafter also referred to as the "monitored apparatus list"). The NMS 4 may belong to the same subnet as that of the redundant communication apparatus 2. Further, the NMS 4 controls its active communication apparatus 10*a*, collects statistical information thereof, monitors the operation thereof such as a notification of an event, and detects a failure that has occurred in the active communication apparatus 10*a*.

When the NMS 4 detects a failure in the active system of the redundant communication apparatus 2, the redundant communication apparatus 2 performs system switching between the active system and the standby system, and thereby makes the system which had been the standby system operate as the active system. In this way, the redundant communication apparatus 2 can perform system switching without stopping the system.

(DHCP Server 3 and Router 5)

The DHCP server 3 is a server computer that dynamically assigns IP addresses to apparatuses connected to the same subnet network, distributes IP addresses to the apparatuses, and manages the distributed IP addresses. The DHCP server 3 belongs to the same subnet as that of the redundant communication apparatus 2 and is connected to the active communication apparatus 10*a* of the redundant communication apparatus 2 so as to be able to communicate with the active communication apparatus 10*a*. Then, the DHCP server 3 assigns an IP address and distributes the assigned IP address to the active communication apparatus 10*a* in response to a request from the active communication apparatus 10*a*.

As a general rule, the DHCP server 3 manages distributed IP addresses by using the MAC addresses of apparatuses. However, according to Option 61 of RFC (Request for Comments) 2131, when the client identification information (ID) of the DHCP is specified in a Discover message or a Request message, the DHCP server 3 identifies the host to which the IP address is distributed based on the client identification information (ID) rather than based on the MAC address. According to the RFC 2131, the client ID is specified so that when, for example, a faulty network card (NIC) is replaced, the same IP address is issued to a new network card after the replacement. The DHCP server 3 manages distributed IP addresses by using a database of distributed IP addresses (hereinafter referred to as a "distributed IP address database").

The router 5 is an example of a communication device belonging to the same subnet as that of the redundant communication apparatus 2. Note that each of the NMS 4, the DHCP server 3, and the router 5 holds an ARP (Address Resolution Protocol) table. The ARP table is a correspondence table in which IP addresses of communication devices including the redundant communication apparatus 2 on the network of the same subnet are associated with MAC addresses of these communication devices.

(Communication Apparatus 10*a*)

Next, the configuration of the communication apparatus 10*a* will be described in detail.

The communication apparatus 10*a* is a computer whose operating mode can be switched between a plurality of modes. In the second example embodiment, the operating modes include a "system startup mode", an "active mode" and a "standby mode".

The "system startup mode" is an operating mode in which the communication apparatus 10*a* starts up the internal system as the system of the redundant communication apparatus 2. The "active mode" is a mode in which the communication apparatus 10*a* operates as the active system of the redundant communication apparatus 2. The "standby mode" is a mode in which the communication apparatus 10*a* operates as the standby system of the redundant communication apparatus 2.

The communication apparatus 10*a* includes a mode switching unit 11, a synchronization control unit 12, an address acquisition unit 13, an ARP table update unit 14, and a storage unit 15.

The mode switching unit 11 is connected to each of the components included in the communication apparatus 10*a*. The mode switching unit 11 selects the operating mode and controls each of the components according to the selected operating mode. The mode switching unit 11 may switch the operating mode in response to an input entered by an operator, or may switch the operating mode in response to the reception of a notification indicating that a failure has been detected from the NMS 4.

The synchronization control unit 12 is connected to the storage unit 15. In the case in which the operating mode is set to the "active mode", the synchronization control unit 12 shares various types of information stored in the storage unit 15 with the other communication apparatus(es) 10*a* included in the redundant communication apparatus 2. For example, in the "active mode", the synchronization control unit 12 shares a client ID 17 stored in the storage unit 15 with the other communication apparatus(es) 10*a* included in the redundant communication apparatus 2. Further, in the "active mode", the synchronization control unit 12 makes a distributed IP address database 16 of the other communication apparatus(es) 10*a* included in the redundant communication apparatus 2 synchronize with that stored in its own storage unit 15.

In the case in which the operating mode is set to the "active mode", the address acquisition unit 13 transmits/receives a message(s) to/from the DHCP server 3 and acquires an IP address distributed by the DHCP server 3. The address acquisition unit 13 acquires, in response to switching of the operating mode from the "system startup mode" to the "active mode", an IP address from the DHCP server 3 by using a discover message and request message each in which the client ID 17 is added Further, the address acquisition unit 13 acquires, in response to switching of the operating mode from the "standby mode" to the "active mode", an IP address from the DHCP server 3 by using a request message in which the client ID 17 is added. Further, the address acquisition unit 13 is connected to the storage unit 15 and stores information related to the acquired IP address in the storage unit 15.

In response to the acquisition of the IP address from the DHCP server 3, the ARP table update unit 14 makes the communication devices on the same subnet network update the ARP tables held by these communication devices.

The storage unit 15 is a storage medium that stores various types of information related to the acquisition of an IP address. In the second example embodiment, the storage unit 15 stores the distributed IP address database 16, a client ID 17, and a MAC address 18.

The distributed IP address database 16 is a database that stores information related to IP addresses including the acquired IP address.

The client ID 17 is a DHCP client ID and is ID that is set in advance so that it is uniquely identified in the subnet. For example, the client ID 17 may be information by which the redundant communication apparatus 2 can be uniquely identified, such as information based on the MAC address of one of the communication apparatuses 10*a* included in the redundant communication apparatus 2. The client ID 17 is commonly used by all the communication apparatuses 10*a* included in the redundant communication apparatus 2.

The MAC address 18 is a MAC address set in the own communication apparatus 10*a*.

FIG. 4 shows an example of a data structure of the monitored apparatus list of the NMS 4 according to the second example embodiment. The monitored apparatus list is a list of IP addresses of apparatuses to be monitored. As an example, the NMS 4 registers, in the monitored apparatus list, a record in which the apparatus to be monitored i.e., the "redundant communication apparatus 2" and its IP address "192.168.0.100" are associated with each other based on a notification sent from the active communication apparatus 10*a* of the redundant communication apparatus 2.

Figure 5:
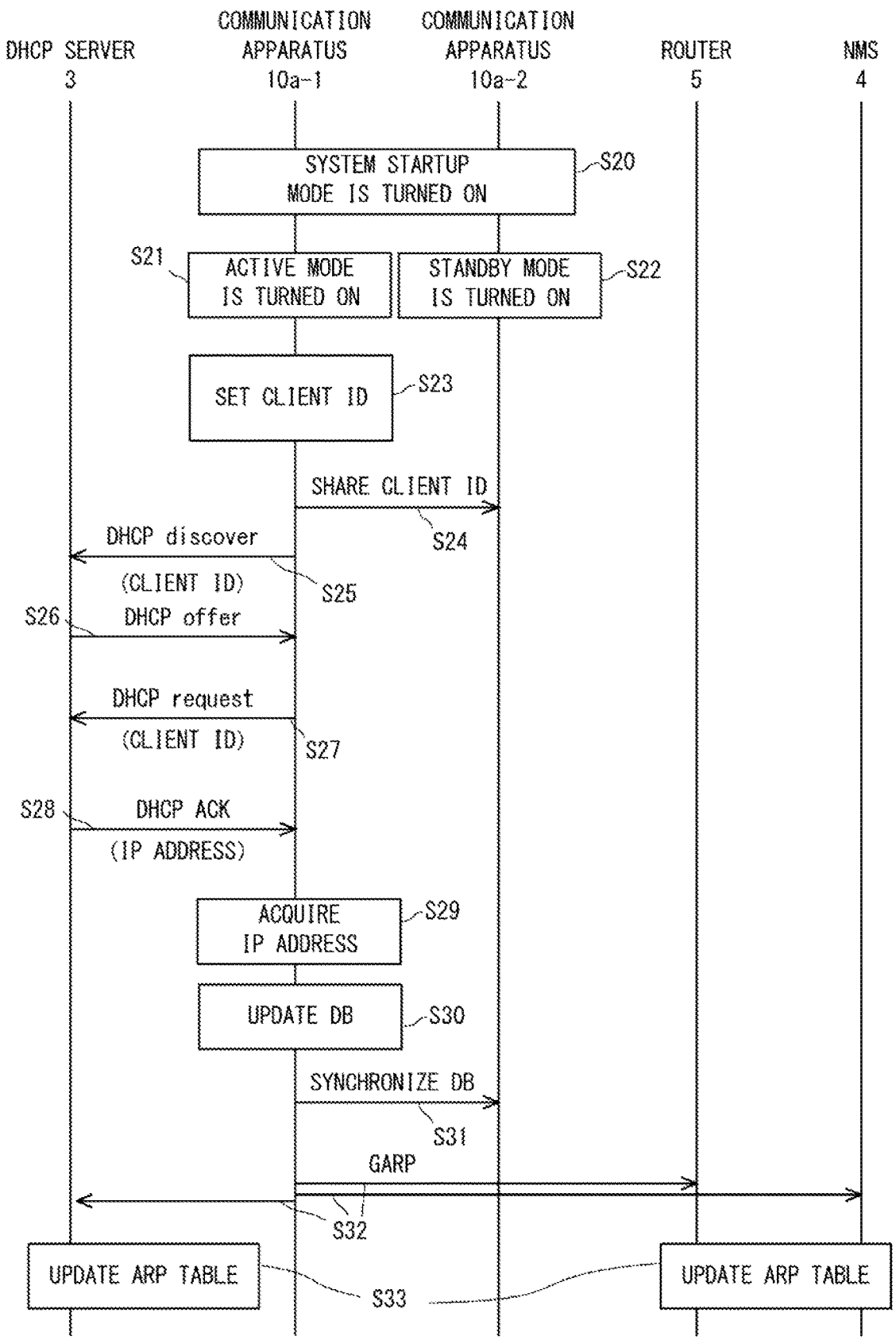
FIG. 5 is a sequence diagram showing processes that are performed when the redundant communication system according to the second example embodiment is started up.

Next, processes that are performed when the redundant communication system 1*a* is started up will be described with reference to FIGS. 5 to 8. FIG. 5 is a sequence diagram showing processes that are performed when the redundant communication system 1*a* according to the second example embodiment is started up.

Firstly, each of the mode switching units 11 of the communication apparatuses 10*a*-1 and 10*a*-2 of the redundant communication apparatus 2 sets the operating mode to the "system startup mode" (Step S20). The communication apparatuses 10*a*-1 and 10*a*-2 may start up the system in response to an input entered by an operator, and the mode switching unit 11 may automatically set the operating mode to the "system startup mode" in response to the startup of the system.

Next, the mode switching unit 11 of the communication apparatus 10*a*-1 sets the operating mode to the "active mode" (Step S21). The mode switching unit 11 of the communication apparatus 10*a*-1 may set the operating mode to the "active mode" based on an input entered by an operator.

Further, the mode switching unit 11 of the communication apparatus 10*a*-2 sets the operating mode to the "standby mode" (Step S22). The mode switching unit 11 of the communication apparatus 10*a*-2 may set the operating mode to the "standby mode" based on an input entered by an operator or based on a notification sent from the communication apparatus 10*a*-1.

Figures 6, 7:
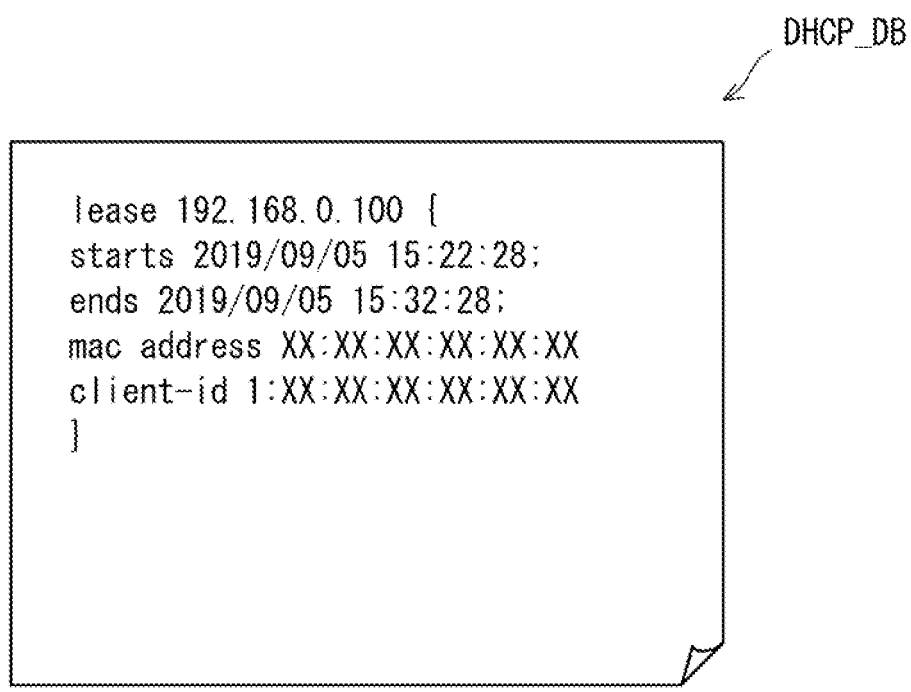
FIG. 6 shows an example of a data structure of a client ID according to the second example embodiment.
FIG. 7 shows an example of a data structure in a database of distributed IP addresses of a DHCP server according to the second example embodiment.

Next, a client ID setting unit (not shown) of the communication apparatus 10*a*-1 sets the client ID 17 and stores it in the storage unit 15 (Step S23). FIG. 6 shows an example of a data structure of the client ID 17 according to the second example embodiment. In this example, the client ID 17 is "1:XX:XX:XX:XX:XX:XX" and is determined based on the MAC address of the communication apparatus 10*a*-1 functioning as the first system. Alternatively, however, the client ID 17 may be "XX:XX:XX:XX:XX:XX" identical to the MAC address of the communication apparatus 10*a*-1 functioning as the first system.

Next, in response to the setting of the client ID 17, the synchronization control unit 12 of the communication apparatus 10*a*-1 shares the set client ID 17 with the communication apparatus 10*a*-2 (Step S24). The client ID 17 is stored in the storage unit 15 of the communication apparatus 10*a*-2. Note that the synchronization control unit 12 of the communication apparatus 10*a*-1 may share the client ID 17 with the communication apparatuses 10*a* in response to the setting or the change of the client ID 17 by the client ID setting unit.

Note that the client ID 17 may be set in advance and stored in the storage unit 15 of each of the communication apparatuses 10*a*. In such a case, the steps S23 and S24 are omitted.

Next, the address acquisition unit 13 of the communication apparatus 10*a*-1 broadcasts a DHCP discover in which the client ID is added (Step S25). The DHCP discover is a DHCP discover message.

In response to the reception of the DHCP discover, the DHCP server 3 transmits a DHCP offer, i.e., a response message to the DHCP discover, to the communication apparatus 10*a*-1 (Step S26).

Then, the communication apparatus 10*a*-1 transmits a DHCP request, which is a message for requesting the configuration information of the network, to the DHCP server 3, from which the response has been sent (Step S27). Note that the client ID is added in the DHCP request.

Then, in response to the reception of the DHCP request, the DHCP server 3 assigns an IP address to the client identified by the client ID, and transmits a DHCP ACK in which the assigned IP address is added to the communication apparatus 10*a*-1 (Step S28). Note that the DHCP ACK is a response message to the DHCP request.

Note that the DHCP server 3 updates the distributed IP address database held by the DHCP server 3 itself.

FIG. 7 shows an example of a data structure in the distributed IP address database of the DHCP server 3 according to the second example embodiment. In the drawing, a DHCP_DB is shown as the distributed IP address database. The DHCP_DB includes distributed IP addresses, lease periods, MAC addresses to be distributed, and client IDs to be distributed. In this way, the DHCP server 3 manages the client IDs together with the distributed IP addresses.

Next, the address acquisition unit 13 of the communication apparatus 10*a*-1 acquires and sets an IP address distributed by the DHCP protocol (Step S29). Then, the address acquisition unit 13 of the communication apparatus 10*a*-1 registers information related to the IP address in the distributed IP address database 16, and thereby updates the distributed IP address database 16 (Step S30).

FIG. 8 shows an example of a data structure in the distributed IP address database 16 of the communication apparatus 10*a* according to the second example embodiment. In the drawing, a DEVICE_DB is shown as the distributed IP address database 16 of the communication apparatus 10*a*. The DEVICE_DB contains information related to the IP address. As an example, the information related to the IP address includes the distributed IP addresses and an IP address indicating identification information of the distribution source DHCP server 3. Further, the information related to the IP address may include timestamps of updating (Renew), rebinding (Rebind), and expiration (Expire).

The synchronization control unit 12 of the communication apparatus 10*a*-1 makes the distributed IP address database 16 of the standby communication apparatus 10*a*-2 synchronize with that of the communication apparatus 10*a*-1 in response to the updating (the Renew) of the distributed IP address database 16 (Step S31). Note that, in addition to or instead of the above-described synchronization, the synchronization control unit 12 of the communication apparatus 10*a*-1 may periodically synchronize the distributed IP address database 16 with that of the standby communication apparatus 10*a*-2. By these synchronizations, the standby system can immediately cope with (i.e., respond to) the system switching.

Then, the ARP table update unit 14 of the communication apparatus 10*a*-1 transmits a GARP (Gratuitous ARP) packet to the communication device under the subnet, and urges that communication device to update the ARP table held therein (Step S32). In this way, the communication device, which has received the GARP packet, updates the ARP table held by the communication device itself (Step S33).

Figure 9:
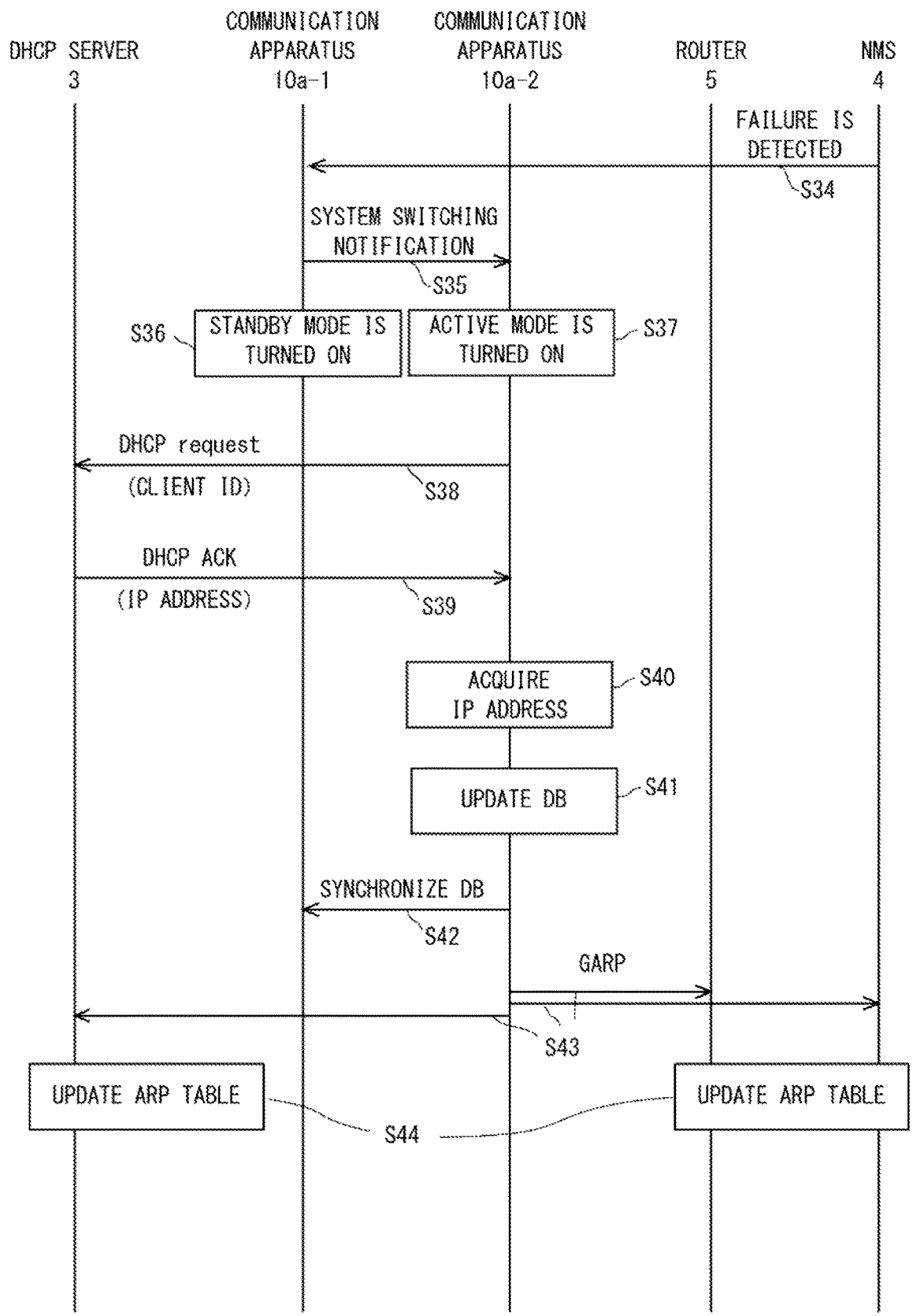
FIG. 9 is a sequence diagram showing processes that are performed at the time of system switching of the redundant communication system according to the second example embodiment.

Next, processes that are performed at the time of the system switching of the redundant communication system 1a will be described with reference to FIGS. 9 and 10. FIG. 9 is a sequence diagram showing processes that are performed at the time of the system switching of the redundant communication system 1a according to the second example embodiment. As an example, assume a case in which a failure occurs in the communication apparatus 10a-1 functioning as the active system.

The NMS 4 detects the failure of the communication apparatus 10a-1, and notifies the communication apparatus 10a-1 that the failure has been detected therein (Step S34).

Upon receiving the notification from the NMS 4, the communication apparatus 10a-1 transmits a system-switching notification to the standby communication apparatus 10a-2 (Step S35).

Then, the mode switching unit 11 of the communication apparatus 10a-1 switches its operating mode from the "active mode" to the "standby mode" (Step S36). Further, the mode switching unit 11 of the communication apparatus 10a-2 switches its operating mode from the "standby mode" to the "active mode" (Step S37).

The address acquisition unit 13 of the communication apparatus 10a-2, which has newly become the active system, transmits a DHCP request in which the client ID 17 is added to the DHCP server 3 based on the information related to the IP address stored in the distributed IP address database 16 (Step S38).

The DHCP server 3 determines that the received DHCP request is a request message sent from the same apparatus as the apparatus that had functioned as the active system before the system switching, and transmits a DHCP ACK in which the same IP address as the IP address distributed before the system switching is added to the communication apparatus 10a-2 (Step S39). Note that the DHCP server 3 determines whether or not the client ID 17 added in the DHCP request is stored in the distributed IP address database held by the DHCP server 3 itself. When the same client ID as the client ID 17 is stored in its own distributed IP address database, the DHCP server 3 adds, in the DHCP ACK, the IP address associated with the client ID in the distributed IP address database.

Next, the address acquisition unit 13 of the communication apparatus 10a-2 acquires and sets the IP address distributed by the DHCP protocol (Step S40). Then, the address acquisition unit 13 of the communication apparatus 10a-2 registers information related to the IP address in the distributed IP address database 16, and thereby updates the distributed IP address database 16 (Step S41).

Next, the synchronization control unit 12 of the communication apparatus 10a-2 makes the distributed IP address database 16 of the standby communication apparatus 10a-1 synchronize with that of the communication apparatus 10a-2 (Step S42).

Then, the ARP table update unit 14 of the communication apparatus 10a-2 transmits a GARP packet to the communication device under the subnet, and urges that communication device to update the ARP table held therein (Step S43). In this way, the communication device, which has received the GARP packet, updates the ARP table held by the communication device itself (Step S44).

Figure 10:
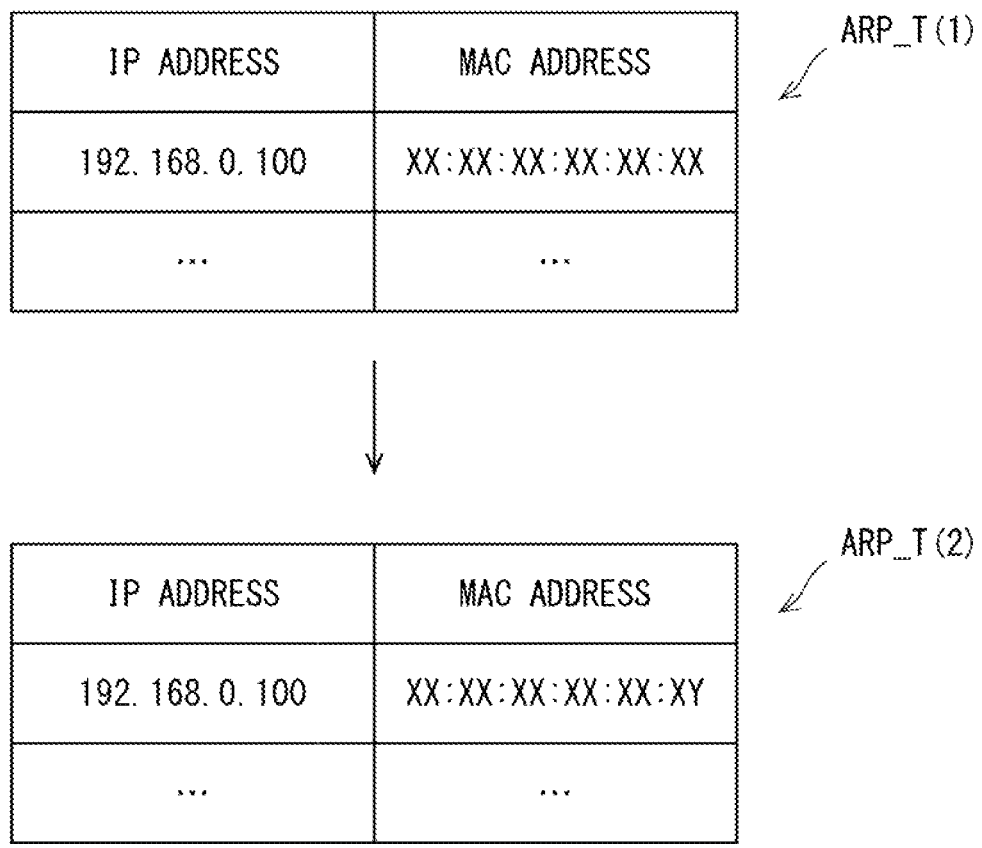
FIG. 10 is a diagram for explaining updating of an ARP table according to the second example embodiment.

FIG. 10 is a diagram for explaining the updating (the Renew) of the ARP table according to the second example embodiment. In the drawing, ARP_T(1) and ARP_T(2) are shown as an ARP table before the system switching and one after the system switching, respectively. After the system switching, the MAC address associated with the IP address "192.168.0.100" of the redundant communication apparatus 2 is changed from "XX:XX:XX:XX:XX:XX" of the communication apparatus 10a-1 to "XX:XX:XX:XX:XX:XY" of the communication apparatus 10a-2.

In this way, when the system is switched, the redundant communication apparatus 2 can minimize the disconnection of communication with other communication devices such as the NMS 4, the DHCP server 3, and the router 5, and can immediately restore the communication.

Note that when the communication apparatus 10a-2, which has newly become the active system, performs updating (Renew) and rebinding (Rebind), the processes shown in the step S38 to S44 may also be performed.

Note that, instead of the above-described steps, when the DHCP server 3 receives a DHCP discover/request in which the client ID 17 is not added, the DHCP server 3 distributes an IP address different from the one that had been used before the system switching based on a different MAC address. Therefore, the NMS 4 has to change the IP address in the monitored apparatus list, therefore causing an additional workload.

According to the second example embodiment, the redundant communication system 1a acquires an IP address by using a client ID that is shared between the communication apparatuses 10a. Therefore, in the redundant communication system 1a, when system switching occurs, the new active apparatus can continue to use the IP address of the active apparatus that has been used before the switching. In this way, in a system such as the NMS 4 which identifies the active apparatus by its IP address, there is no need to register the IP address of the apparatus to be monitored or the like again when system switching is performed.

Further, the redundant communication system 1a shares information related to the acquired IP address between the communication apparatuses 10a. Therefore, when system switching occurs, the standby communication apparatus 10a can immediately send a request message to the DHCP server 3.

Further, the redundant communication system 1a shares, in response to the setting of the client ID 17, the set client ID 17 between the communication apparatuses 10a. Therefore, even if the client ID 17 is changed for some reason, the changed client ID 17 is shared between the communication apparatuses 10a.

In the above-described example embodiments, the computer is formed by a computer system including a personal computer, a word processor, and the like. However, the computer may be formed by a LAN (Local Area Network) server, a host of computer (personal computer) communication, a computer system connected to the Internet, or the like. Further, it is also possible to distribute functions over respective apparatuses on the network, and thereby to form the computer using the whole network.

Further, although the present disclosure is described as a hardware configuration in the above-described example embodiments, the present disclosure is not limited to the hardware configurations. In the present disclosure, any of the processes described above can also be implemented by causing a processor to execute a computer program.

In the above-described examples, a CPU (Central Processing Unit), a GPU (Graphics Processing Unit), an FPGA (field-programmable gate array), a DSP (digital signal processor), an ASIC (application specific integrated circuit), or the like may be used as the processor.

In the above example embodiments, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The executions of processes in the system and the method shown in the claims, the specification, and the drawings may be performed in an arbitrary order, unless explicitly stated as "before", "in advance of", or the like, and unless the output of the previous process is used in the subsequent process. Even if operations in an operation flow in the claims, the specification, and the drawings are described by using terms such as "Firstly" and "Next" for the sake of explanation, they do not necessarily have to be performed in the described order.

The whole or part of the example embodiments disclosed above can be described as, but not limited to, the following supplementary notes.

(Supplementary Note 1)

A communication apparatus provided in a redundant communication system including a plurality of communication apparatuses having mutually-redundant configurations, the communication apparatus being configured so that its operating mode can be switched between a plurality of modes including an active mode and a standby mode, the communication apparatus comprising:

a synchronization control unit configured to share client identification information with another communication apparatus included in the redundant communication system; and an address acquisition unit configured to acquire, in response to switching of the operating mode to the active mode, an IP (Internet Protocol) address from a DHCP (Dynamic Host Configuration Protocol) server by using the client identification information.

(Supplementary Note 2)

The communication apparatus described in Supplementary note 1, wherein the plurality of modes further include a system startup mode, the address acquisition unit acquires, in response to the switching of the operating mode from the system startup mode to the active mode, the IP address from the DHCP server by using discover and request messages in which the client identification information is added, and the address acquisition unit acquires, in response to the switching of the operating mode from the standby mode to the active mode, the IP address from the DHCP server by using a request message in which the client identification information is added.

(Supplementary Note 3)

The communication apparatus described in Supplementary note 1 or 2, further comprising a storage unit configured to store the client identification information, wherein the synchronization control unit shares the client identification information stored in the storage unit with the other communication apparatus included in the redundant communication system when the operating mode is set to the active mode.

(Supplementary Note 4)

The communication apparatus described in any one of Supplementary notes 1 to 3, further comprising a storage unit configured to store the acquired IP address, wherein the synchronization control unit shares information related to the IP address stored in the storage unit with the other communication apparatus included in the redundant communication system when the operating mode is set to the active mode.

(Supplementary Note 5)

The communication apparatus described in any one of Supplementary notes 1 to 4, further comprising an ARP (Address Resolution Protocol) table updating unit configured to make, in response to the acquisition of the IP address, a communication device on a network of the same subnet update an ARP table.

(Supplementary Note 6)

A redundant communication system comprising a first communication apparatus and a second communication apparatus, each of the first and second communication apparatuses being configured so that its operating mode can be switched between a plurality of modes including an active mode and a standby mode, the first and second communication apparatuses having mutually-redundant configurations, wherein the first and second communication apparatuses share client identification information with each other, the first communication apparatus acquires, in response to switching of the operating mode of the first communication apparatus to the active mode, an IP (Internet Protocol) address from a DHCP (Dynamic Host Configuration Protocol) server by using the client identification information, and the second communication apparatus acquires, in response to switching of the operating mode of the second communication apparatus to the active mode, an IP address from the DHCP server by using the client identification information.

(Supplementary Note 7)

The redundant communication system described in Supplementary note 6, further comprising a network management system configured to identify, of the first and second communication apparatuses, a communication apparatus whose operating mode is the active mode by the IP address, and monitoring the communication apparatus.

(Supplementary Note 8)

A method for controlling communication performed by a communication apparatus provided in a redundant communication system including a plurality of communication apparatuses having mutually-redundant configurations, the communication apparatus being configured so that its operating mode can be switched between a plurality of modes including an active mode and a standby mode, the method comprising:

a synchronization control step of sharing client identification information with another communication apparatus included in the redundant communication system; and an address acquisition step of acquiring, in response to switching of the operating mode to the active mode, an IP (Internet Protocol) address from a DHCP (Dynamic Host Configuration Protocol) server by using the client identification information.

(Supplementary Note 9)

A communication control program for causing a communication apparatus to perform a method for controlling communication, wherein the communication apparatus is provided in a redundant communication system including a plurality of communication apparatuses having mutually-redundant configurations, the communication apparatus being configured so that its operating mode can be switched between a plurality of modes including an active mode and a standby mode, and the communication control method comprises:

a synchronization control step of sharing client identification information with another communication apparatus included in the redundant communication system; and an address acquisition step of acquiring, in response to switching of the operating mode to the active mode, an IP (Internet Protocol) address from a DHCP (Dynamic Host Configuration Protocol) server by using the client identification information.

The first and second embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

According to the present disclosure, it is possible to provide a communication apparatus, a redundant communication system, and a communication control method in which when system switching between an active system and a standby system occurs, an IP address of the active apparatus before the switching can be continuously used after the switching.

What is claimed is:

1. A communication apparatus of a redundant communication system comprising:
at least one memory configured to store instructions; and
at least one processor configured to execute the instructions to:
share client identification information with a different communication apparatus in the redundant communication system, the communication apparatus and the different communication apparatus having mutually-redundant configurations;
switch an operating mode between a plurality of modes including an active mode, a standby mode, and a system startup mode;
acquire, in response to switching of the operating mode from the system startup mode to the active mode, an IP (Internet Protocol) address from a DHCP (Dynamic Host Configuration Protocol) server by using a discover message in which the client identification information is added and a request message in which the client identification information is added; and
acquire, in response to the switching of the operating mode from the standby mode to the active mode, the IP address from the DHCP server by using the request message in which the client identification information is added.

2. The communication apparatus according to claim 1, further comprising a storage configured to store the client identification information, wherein
the at least one processor is further configured to share the client identification information stored in the storage with the different communication apparatus in the redundant communication system when the operating mode is set to the active mode.

3. The communication apparatus according to claim 1, further comprising a storage configured to store information related to the acquired IP address, wherein
the at least one processor is configured to share the information related to the IP address stored in the storage with the different communication apparatus in the redundant communication system when the operating mode is set to the active mode.

4. The communication apparatus according to claim 1, wherein the at least one processor is further configured to update, in response to acquisition of the IP address, an ARP (Address resolution table) in a communication device on a network of a same subnet as the communication apparatus.

5. A redundant communication system comprising a first communication apparatus and a second communication apparatus having mutually-redundant configurations, wherein
the first communication apparatus comprises:
at least one first memory configured to store first instructions; and
at least one first processor configured to execute the first instructions to:
share client identification information with the second communication apparatus;
switch an operating mode of the first communication apparatus between a plurality of modes including an active mode, a standby mode, and a system startup mode;
acquire, in response to switching of the operating mode of the first communication apparatus from the system startup mode to the active mode, an IP (Internet Protocol) address from a DHCP (Dynamic Host Configuration Protocol) server by using a discover message in which the client identification information is added and a request message in which the client identification information is added; and
acquire, in response to the switching of the operating mode of the first communication apparatus from the standby mode to the active mode, the IP address from the DHCP server by using the request message in which the client identification information is added.

6. The redundant communication system according to claim 5, wherein
the second communication apparatus comprises:
at least one second memory configured to store second instructions; and
at least one second processor configured to execute the second instructions to:
switch an operating mode of the second communication apparatus between the plurality of modes including the active mode and the standby mode; and
acquire, in response to switching of the operating mode of the second communication apparatus to the active mode, the IP address from the DHCP server by using the client identification information.

7. The redundant communication system according to claim 5, further comprising a network management system, wherein
the network management system comprises:
at least one monitoring-side memory configured to store monitoring-side instructions; and at least one monitoring-side processor configured to execute the monitoring-side instructions to identify, of the first and second communication apparatuses, a communication apparatus having the operating mode that is the active mode by the IP address, and monitor the communication apparatus.

8. A communication control method comprising:
sharing client identification information with another communication apparatus in a redundant communication system including a plurality of communication apparatuses having mutually-redundant configurations;
switching an operating mode between a plurality of modes including an active mode, a standby mode, and a system startup mode;
acquiring, in response to switching of the operating mode from the system startup mode to the active mode, an IP (Internet Protocol) address from a DHCP (Dynamic Host Configuration Protocol) server by using a discover message in which the client identification information is added and a request message in which the client identification information is added; and
wherein the plurality of modes further include a system startup mode,
acquiring, in response to the switching of the operating mode from the standby mode to the active mode, the IP address from the DHCP server by using a request message in which the client identification information is added.

* * * * *